United States Patent [19]

Arzoumanidis et al.

[11] 4,422,956
[45] Dec. 27, 1983

[54] ACTIVATION OF COMPLEXED REDUCED TITANIUM HALIDE OLEFIN POLYMERIZATION CATALYST WITH HALOALKYLCHLOROSILANES

[75] Inventors: Gregory G. Arzoumanidis, Naperville; Sam S. Lee, Hoffman Estates, both of Ill.

[73] Assignee: Standard Oil Company (Indiana), Chicago, Ill.

[21] Appl. No.: 378,405

[22] Filed: May 14, 1982

[51] Int. Cl.$^3$ ................................................ C08F 4/64
[52] U.S. Cl. ..................................... 502/158; 526/128; 502/168
[58] Field of Search ...................................... 252/429 B

[56] References Cited

U.S. PATENT DOCUMENTS

| | | | |
|---|---|---|---|
| 3,676,418 | 7/1972 | Tashiro et al. | 252/429 B X |
| 3,825,524 | 7/1974 | Wada et al. | 252/429 B X |
| 4,250,287 | 2/1981 | Matlack | 252/429 B X |
| 4,255,280 | 3/1981 | Sakurai et al. | 252/429 B |
| 4,295,991 | 10/1981 | Wristers | 252/429 B X |
| 4,324,693 | 4/1982 | Arzoumanidis et al. | 252/429 B |

*Primary Examiner*—Patrick Garvin
*Attorney, Agent, or Firm*—Wallace L. Oliver; William T. McClain; William H. Magidson

[57] ABSTRACT

A titanium-containing olefin polymerization catalyst component comprises a titanium-containing component formed by reducing titanium tetrachloride with an organoaluminum compound, optionally contacting the resulting reduced solid with a pretreatment amount of alpha-olefin monomer under polymerization conditions, and reacting the resulting product with a Lewis base complexing agent and a haloalkylchlorosilane.

32 Claims, No Drawings

ACTIVATION OF COMPLEXED REDUCED TITANIUM HALIDE OLEFIN POLYMERIZATION CATALYST WITH HALOALKYLCHLOROSILANES

BACKGROUND OF THE INVENTION

This invention relates to olefin polymerization catalysts and more particularly to improved catalysts for the polymerization of propylene and higher alpha-olefins.

Olefin polymerization catalysts based on transition metal compounds and aluminum alkyls are well known in the art. Particularly, the use of titanium trihalide compounds to produce crystalline propylene polymers has been reported widely. Among recently published catalytic systems based on titanium trihalides are U.S. Pat. Nos. 3,984,350; 4,210,738; 4,210,729; 4,210,736; 4,295,991; 4,182,691 and 4,183,826; all of these references are incorporated herein by reference.

U.S. Pat. No. 4,210,738 describes a titanium halide-based catalyst in the delta crystalline form and having a color tending toward violet made by reducing titanium tetrachloride with an aluminum alkyl, treating the reduced solid with an ether, thioether or thiol complexing agent and reacting with additional titanium tetrachloride.

U.S. Pat. No. 4,210,729 describes a method to preactivate the catalyst described in U.S. Pat. No. 4,210,738 with a metal organic compound of Groups IA, IIA, IIB, or IIIA.

U.S. Pat. No. 4,210,736 describes catalysts such as those listed in U.S. Pat. No. 4,210,738 which have been dried.

U.S. Pat. No. 3,984,350 describes a highly catalytically active titanium trihalide composition in the beta crystalline form having a brown color formed by reducing titanium tetrachloride with an aluminum alkyl and reacting, under controlled conditions, the resulting reduced product with a complexing agent and additional titanium tetrachloride.

U.S. Pat. No. 4,295,991 describes a method to treat a catalyst such as described in the above-cited U.S. patents with olefin monomer such that the resulting catalyst particle is non-friable. The method disclosed in this patent comprises contacting a reduced titanium trihalide composition with olefin monomer, such as propylene, before reacting with a Lewis base complexing agent and either titanium tetrachloride or a chlorinated hydrocarbon.

U.S. Pat. Nos. 4,182,691 and 4,183,826 describe a titanium trichloride catalyst component prepared by reducing titanium tetrachloride with an organoaluminum compound and contacting the reduced solids with a chlorinated hydrocarbon and an aliphatic ether complexing agent.

U.S. patent application Ser. No. 196,012 filed Oct. 10, 1980 and now U.S. Pat. No. 4,324,693, assigned to a common assignee and incorporated by reference herein, discloses an improved olefin polymerization catalyst component prepared by reducing titanium tetrachloride with an aluminum alkyl, contacting the resulting reduced solid with a pretreatment amount of alpha-olefin monomer under polymerization conditions and reacting the resulting product with a Lewis base complexing agent in a molar ratio to the reduced titanium compound of greater than 1.15 to 1 and additional titanium tetrachloride. In addition, a mixed Lewis base complexing agent comprising isoamyl ether and n-butyl ether was found advantageous.

U.S. patent application Ser. No. 297,272 filed Aug. 28, 1981 and now U.S. Pat. No. 4,440,494, assigned to a common assignee and incorporated by reference herein, discloses an improved olefin polymerization catalyst in which the titanium-containing component is an ether-complexed, titanium tetrachloride or chlorocarbon-activated and reduced titanium halide and in which the halogen/aluminum atomic ratio of an aluminum alkyl halide component is between 0.89 and 0.98.

There are many examples of treatment of titanium-containing olefin polymerization catalysts with silicon tetrachloride such as U.S. Pat. Nos. 3,833,515, 3,992,322, 4,022,958, 4,098,907, 4,149,990, and 4,158,988; German Offen. No. 2,111,455 (Chem. Abst. 78: 16788j). Japanese Kokai No. 98,076/77 (Chem. Abst. 88: 38333r); Japanese Kokai No. 90,389/78 (Chem. Abst. 89: 180621i); Japanese Kokai No. 94,908/80 (Chem. Abst. 93: 221319h); and Japanese Kokai No. 73,707/80 (Chem. Abst. 93: 150909n). Other references also describe treatment with chlorosilane (HSiCl$_3$) such as Japanese Kokai No. 100,986/78 (Chem. Abst. 89: 216061f); Japanese Kokai No. 119,387/79 (Chem. Abst. 92: 42618n); Japanese Kokai No. 138,887/79 (Chem. Abst. 92: 111526v); Japanese Kokai No. 36,203/80 (Chem. Abst. 93: 27105v); Japanese Kokai No. 147,505/80 (Chem. Abst. 94: 122285h); and Japanese Kokai No. 147,506/80 (Chem. Abst. 94: 122287k).

Alkyl-substituted chlorosilanes, such as methyl trichlorosilane, ethyl trichlorosilane, and methyl dichlorosilane have been used to treat various olefin polymerization catalysts such as U.S. Pat. Nos. 3,676,418, 3,875,126, 4,071,672, 4,085,276 and 4,223,117; Japanese Kokai No. 83,284/75 (Chem. Abst. 83: 179954c); Japanese Kokai No. 119,388/79 (Chem. Abst. 92: 7208g); and Japanese Kokai No. 124,888/79 (Chem. Abst. 92: 7211c).

Specific examples of use of alkyl chlorosilanes include U.S. Pat. Nos. 4,159,963 and 4,159,965 which describe a titanium polymerization component obtained by reacting an organomagnesium component with a chlorosilane containing an Si—H bond then reacting the product with a specified titanium compound. The organosilane has a formula

$$HaSiCl_bR_4-(a+b)$$

wherein a and b are numbers greater than 0 such that $a \leq 2$ and $a+b \leq 4$ and R is a hydrocarbon radical having 1 to 20 carbon atoms. Examples of chlorosilanes included $CH_3SiHCl_2$, $C_2H_5SiHCl_2$, n—$C_3H_7SiHCl_2$, $C_6H_5SiHCl_2$ and 4—$ClC_6H_4SiHCl_2$.

U.S. Pat. No. 3,825,524 describes a titanium trichloride composition formed by reacting TiCl$_4$ with an organoaluminum chloride with a mixed solvent containing an organosilicon compound such as tetrahydrocarbyl silanes, organohydrogensilanes and organohalogensilanes including alkyl trichlorosilanes and alkyl dichlorosilanes.

There is a need for active olefin polymerization catalysts which produce highly crystalline polymer for use in advanced polymerization processes such as gas-phase or bulk processes. The invention disclosed herein produces an active alpha-olefin, especially a propylene, polymerization catalyst, which also produces low amounts of hexane extractables in gas-phase or bulk polymerization processes.

SUMMARY OF THE INVENTION

A titanium-containing olefin polymerization catalyst component comprises a product formed by reducing titanium tetrachloride with an organoaluminum compound, optionally contacting the resulting reduced solid with a pretreatment amount of alpha-olefin monomer under polymerization conditions, and reacting the resulting product with a Lewis base complexing agent and a haloalkylchlorosilane.

BRIEF DESCRIPTION OF THE INVENTION

One type of olefin polymerization catalyst is formed by reducing titanium tetrahalide with an aluminum alkyl, complexing the resulting reduced titanium component with an electron donor compound, such as an ether, and activating the complex with additional titanium tetrahalide or a chlorocarbon depending upon the process used. The resulting titanium halide can be in an active beta (U.S. Pat. No. 3,984,350) or a delta (U.S. Pat. No. 4,210,738) crystalline form. It has been discovered that the titanium tetrahalide or chlorocarbon can be replaced by haloalkylchlorosilanes in the activation step.

The olefin polymerization catalyst system of this invention comprises a reduced titanium-containing component and an organoaluminum compound in which the reduced titanium-containing component is complexed with a Lewis base and activated with a haloalkylchlorosilane.

The first step in preparing the titanium-containing catalyst component of this invention is reducing titanium tetrahalide, preferably titanium tetrachloride and typically dissolved in an inert hydrocarbon diluent, with an organoaluminum compound at a temperature of about $-50°$ C. to about 30° C., preferably about $-30°$ C. to about 0° C. The resulting slurry may be heated or allowed to warm to about 50°–100° C. for a period of up to a few hours. Preferably, the slurry is allowed to warm slowly to about 60° C. to about 70° C. for about one to four hours.

Organoaluminum compounds useful as reducing agents include alkyl aluminum compounds with a general formula $R_nAlX_{3-n}$ where R is an alkyl group having one to about ten carbon atoms, X is a halogen, preferably chlorine, and n is greater than zero and less than or equal to three. Examples of suitable alkyl aluminum compounds are trialkyl aluminum, dialkyl aluminum halide, alkyl aluminum dihalides, alkyl aluminum sesquihalides and mixtures thereof. Alkyl groups include methyl, ethyl, n-propyl, isopropyl, n-butyl, isobutyl, s-butyl and mixtures thereof. Preferable reducing compounds are diethyl aluminum chloride and ethyl aluminum sesquichloride. The molar amount of organoaluminum compound to titanium tetrachloride can vary from about 0.5 to 1 to over 2 to 1 and preferably is about 0.75 to 1 to about 1.5 to 1.

Diluents useful in the titanium tetrachloride reduction include organic liquids substantially inert under the conditions used and include alkanes such as pentane, hexane, cyclohexane and the like.

Typically, the organoaluminum reducing agent in a hydrocarbon diluent is added, usually dropwise over about 15 minutes to four hours, to a cold solution of titanium tetrachloride in a suitable diluent with agitation. The resulting slurry preferably is heated or allowed to warm to about 50°–100° C. for a few hours.

Adequate agitation is necessary to form catalyst particles with the desired particle size distribution. Proper agitation can depend on speed of an impeller, reactor configuration and point of addition of reactants and can be determined by the skilled artisan by routine experimentation.

The resulting reduced solid contains titanium trichloride in the beta crystalline form according to the generally adopted classification (Journal of Polymer Chemistry, 51, 1961, pp. 399–410). Such titanium trichloride-organoaluminum complex preferably can be contacted with a polymerizable alpha-olefin under polymerization conditions in a hydrocarbon medium either with or without separating and washing the solid material. If separated, suitable amounts of alkyl aluminum cocatalysts may be added during this prepolymerization procedure.

Alpha-olefins useful in the prepolymerization (pretreatment) procedure can contain from 3 to about 22 carbon atoms, preferably 3 to about 8 carbon atoms, and most preferably is propylene. Other suitable alpha-olefins include butene-1, pentene-1, hexene-1, heptene-1, and 4-methyl-pentene-1. Typically, suitable alpha-olefins contain no branching on the vinylic carbon atom.

The temperature for the prepolymerization procedure can range from about 0° C. to about 100° C. and preferably is about 35° C. to about 65° C.

The pretreatment amount of polymerized alpha-olefin contained on the titanium trihalide compound can range from about 1 to about 1000 wt.%, preferably about 3 to about 100 wt.% and most preferably about 6 to about 30 wt.% based on the weight of titanium trihalide complex.

Typically, after the prepolymerization procedure is completed, the resulting product is separated and washed with a hydrocarbon solvent. The prepolymerized titanium halide complex is considered encapsulated with a coating of polymer.

The reduced titanium-containing product, whether prepolymerized or not, typically in a hydrocarbon diluent, is treated with a Lewis base, i.e., an electron pair donor compound, such as an ether, thioether or thiol, or mixtures thereof. Examples of suitable Lewis base complexing agents are lower (2 to 8 carbon atoms) dialkyl ethers in which the alkyl groups include propyl, n-butyl, isobutyl, cyclohexyl, isoamyl, s-butyl, isopentyl, phenyl and allyl. Examples of ethers are di-n-butyl, diisoamyl, diisopropyl, isobutyl, isoamyl, dicyclohexyl, isopentyl phenol, propyl phenyl, butyl phenyl, phenyl vinyl and phenyl allyl. Also useful are lower alkyl thioethers and thiol including mixtures thereof. Preferable ether complexing agents are diisoamyl and di-n-butyl ethers. Most preferred is a combination of di-n-butyl and diisoamyl ethers in a molar ratio of about 1:3 to about 3:1, preferably about 1:2.

Generally, the Lewis base complexing agent is added to a hydrocarbon slurry of prepolymerized titanium halide product at ambient temperature to about 100° C. Subsequent to or in conjunction with treatment with Lewis base, the product is activated further with a suitable haloalkylchlorosilane compound. The molar ratio of chlorosilane compound to titanium halide can range from about 10:1 to 0.5:1 and preferably from about 2:1 to about 0.7:1. Preferably, activation with haloalkylchlorosilane is carried out for 2 to 10 hours at 60° to 95° C.

Haloalkylchlorosilanes useful in this invention include compounds with the formula

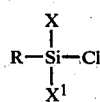

wherein R is a haloalkyl radical containing one to about ten carbon atoms or a halosilyl radical or haloalkylsilyl radical containing one to about eight carbon atoms, and X and $X^1$ are halogen, hydrogen, or alkyl or haloalkyl radicals containing one to about ten carbon atoms. Typically, R is a chloroalkyl radical containing one to about eight carbon atoms and one to about twelve chlorine atoms, and X is chlorine or a chloroalkyl radical containing one to four carbon atoms, and $X^1$ is a hydrogen or chlorine. Preferable haloalkylchlorosilanes useful in this invention are dichlorosilanes and trichlorosilanes. Also preferable are haloalkylchlorosilanes containing a chloroalkyl group containing one to about four carbon atoms and one to ten chlorine atoms. Preferable haloalkylchlorosilanes include dichloromethyl trichlorosilane, trichloromethyl trichlorosilane, dichloromethyl dichlorosilane, trichloromethyl dichlorosilane, chloromethyl trichlorosilane and hexachlorodisilane. Trichloromethyl trichlorosilane and dichloromethyl trichlorosilane are most preferred.

After the reduced catalyst component is reacted with an haloalkyl chlorosilane compound, the component then can be treated further with additional Lewis base such as an ether or mixed ethers. The molar ratio of additional Lewis base to reduced titanium compound can range from about 1:1 to about 1:20 and typically is about 1:2 to about 1:5.

An important consideration in preparing superior titanium-containing catalyst component is control of the morphology of the catalyst particles. It has been found that catalysts of this invention should have a substantially spherical shape and have average particle sizes between about 20 and about 45 microns. By "average particle size" it is meant that 90% of all particles have diameters within 15% of such average size. This average is determined from photomicrographs of catalyst particles using well-established statistical techniques. A preferable catalyst has an average particle size between about 20 and 45 microns and most preferably between about 25 and 35 microns. A good morphology of catalyst particles is necessary for a good morphology of resulting polymer particles. Thus very small particles (fines) and agglomerated particles should be avoided. Generally, particle size can be controlled by the extent of agitation used; increased agitation produces smaller particles.

As described in U.S. Pat. Nos. 3,984,350 and 4,210,738 the crystalline structure of the final product can be either the delta or an active beta form. To form the active beta form the temperature in the activation step is maintained preferably at about 40° C. to about 100° C., most preferably about 80° to about 90° C., for a limited time while the concentration of the haloalkylchlorosilane compound in a hydrocarbon diluent is about 10 to about 30 wt.%. Use of haloalkylchlorosilane solutions above about 30 wt.% generally produces a titanium trihalide product in the delta crystalline form.

The molar ratio of Lewis base complexing agent to titanium compound in the titanium-containing catalyst component of this invention can range from about 0.1:1 to about 2.5:1, preferably about 1:1 to about 1.5:1 and most preferably about 1.25:1 to about 1.35:1.

The titanium halide catalyst component of this invention, whether pretreated or not, may be dried before use in polymerization or may be stored as a slurry in a liquid hydrocarbon such as hexane.

The chemically activated, optionally pretreated, titanium halide catalyst component described in this invention is used in conjunction with an organoaluminum chloride compound as a catalyst system to polymerize alpha-olefins, such as propylene, butene-1, and 4-methyl-pentene-1. This catalyst system is most useful to polymerize propylene or a mixture of propylene and a minor amount of ethylene or other copolymerizable alpha-olefins to a polymer containing a substantial crystalline content.

In olefin polymerization the above-described titanium-containing catalyst component is used in combination with an organoaluminum compound typically with a formula $R_nAlX_{3-n}$ wherein R is hydrogen or an alkyl group having 1 to about 10 carbon atoms, X is a halogen, preferably chloride, and n is greater than zero and less than or equal to three. Examples of organoaluminum compounds are diethyl aluminum chloride, triethyl aluminum, triisobutyl aluminum, diisobutyl aluminum chloride, ethyl aluminum sesquihalide and mixtures thereof. Diethyl aluminum chloride (DEAC) is a preferred organoaluminum compound.

Preferably, the titanium-containing catalyst component is used in combination with an alkyl aluminum halide in which the aluminum/halogen atomic ratio is between 0.89 and 0.98, preferably between 0.92 and 0.98 and most preferably between 0.96 and 0.975. It has been found that by using such catalyst system olefin polymerization activity is increased significantly especially in gas-phase polymerization without significant increase in formation of amorphous polymer as measured by extraction with hot hexane. Alkyl aluminum halides containing an aluminum/halogen atomic ratio of 0.89 to 0.98 can be formed by mixing suitable quantities of dialkyl aluminum halide and trialkyl aluminum. Useful halides include bromides and chlorides and useful alkyl radicals contain from two to about six carbon atoms. The preferable halide is chloride and the preferable alkyl radical is ethyl.

The molar ratio of chemically activated pretreated titanium halide to organoaluminum compound in a catalyst system can range from about 0.1 to about 20, typically is about 1 to 8. The amount of catalyst in a polymerization depends on the reactor size and type, and on the amount and type of olefin monomer, and is known to the skilled artisan.

Catalyst modifiers such as disclosed in U.S. Pat. Nos. 3,950,268 and 4,072,809, incorporated herein by reference, can be added in minor amounts. Examples of catalyst modifiers include alkyl silicates, orthosilicate esters, esters, Lewis bases such as sulfides, phosphines, phosphites, phosphates, phosphine oxides, aromatic amines, amine oxides, secondary and tertiary aliphatic amines, cyclic amines, hindered cyclic amines and ethers or an organometallic chalcogenide such as bis(-trialkyl)tin sulfide (BTS). These additional additives can be present in minor amounts ranging from about 0.1 to 30 mol percent and preferably about 1 to 20 mol percent of the transition metal halide in the catalyst system.

Since the catalyst systems used in this invention are sensitive to oxygen, carbon oxides and moisture, suitable precautions should be taken during catalyst preparation, transfer and use.

The catalyst system described in this invention can be used to polymerize alpha-olefins dissolved or suspended in liquid paraffinic medium, dissolved in liquid monomer, or in the gas phase, although this catalyst system is most beneficial in gas-phase polymerization.

Polymerization processes employing this invention can be practiced at pressures ranging from about atmospheric to about 20,000 psig and preferably from about 30 to 1000 psig.

Polymerization time depends on the process used. In batch processes the polymerization contact time usually is about one-half to several hours and in autoclave processes typically is one to four hours. In a continuous process, contact time in the polymerization zone is controlled as required and typically ranges from about one-half to several hours. Since in this type of process unreacted monomer continuously can be recycled into the polymerization zone, the contact time can be shorter than in a batch process.

Polymerization temperature depends upon the specific catalyst system used and can range from below about 0° C. to about 120° C. However, at temperatures below about 0° C. the polymerization rate slows and reactor residence times become unreasonably long, while at temperatures above about 120° C. the polymerization rate is too high which results in excessive amounts of n-hexane soluble or extractable products. Preferably, the temperature ranges from about 2° C. to about 95° C. and most preferably from about 50° C. to about 80° C.

Gas-phase reactor systems include both stirred bed reactors and fluidized bed reactor systems. Examples of such reactor systems are described in U.S. Pat. Nos. 3,957,448; 3,965,083; 3,971,768; 3,970,611; 4,129,701; 4,101,289; 3,652,527; and 4,003,712, all incorporated by reference herein. Typical gas-phase olefin polymerization reactor systems comprise a reactor vessel to which olefin monomer and catalyst components, can be added and which contains a bed of forming polymer particles. Typically, catalyst components are added together or separately through one or more valve-controlled ports in the reactor vessel. Olefin monomer, typically, is provided to the reactor through a recycle gas system in which unreacted monomer removed as off-gas and fresh feed monomer are mixed and injected into the reactor vessel. A quench liquid, examples of which are lower alkanes or liquid monomer such as propylene, can be added to polymerizing olefin in order to control temperature.

This invention is useful in polymerizing propylene to a normally solid, substantially crystalline polymer, although propylene also can be polymerized with minor amounts up to about 30 wt.% of ethylene or other copolymerizable alpha-olefins containing up to 10 carbon atoms to form random, pure-block, terminal block and multisegment copolymers.

The normally-solid propylene polymers prepared according to this invention have molecular weights ranging from about 50,000 to 5,000,000 and typically range from about 200,000 to 2,000,000. The molecular weights of such propylene polymers can be controlled by methods known to the art, such as by polymerizing in the presence of hydrogen in an amount determined by melt flow rate or by the molecular weight distribution desired.

This invention is demonstrated but not limited by the following examples.

EXAMPLE I

A titanium-containing catalyst component was prepared by reducing 105 grams (0.5535 mole) of titanium tetrachloride in 168 grams of n-hexane cooled to −7° C. in a vigorously stirred one-liter nitrogen-purged autoclave reactor with 71 grams (0.5879 mole) of diethyl aluminum chloride in 213 grams of n-hexane added dropwise over four hours. The temperature was maintained at −7° C. for an additional 15 minutes, raised to 65° C. within one hour, and maintained at 65° C. for two hours. After cooling slightly, the reactor was vented to 1 psig, 24 grams of propylene were admitted slowly. After about 45 minutes, the reactor was vented and flushed several times with nitrogen. The resulting solid product was washed seven times with 225-milliliter portions of n-hexane. The average particle size of such product was 22.5+3 microns. The supernatant liquid from the last wash was decanted and 400 grams of n-hexane were added to the reactor. A mixture of 31.2 grams (0.240 mole) of di-n-butyl ether and 75.9 grams (0.480 mole) of diisoamyl ether was added to the moderately agitated reactor at a temperature of 35° C. Agitation continued for 90 minutes after which the suspension was allowed to settle for 15 minutes. The ethers (Lewis base) to titanium molar ratio was 1.30:1.

Supernatant liquid was decanted and 100 grams (0.580 mole) of dichloromethyl trichlorosilane in 56 grams of n-hexane were added with moderate agitation which was decreased after 15 minutes. The temperature was maintained at 88° C. for 4 hours. After the color of the resulting solid suspension turned from brown-like to purple, 30 milliliters of a di-n-butyl ether and diisoamyl ether mixture (molar ratio 1:2) was added. The temperature was maintained at 70° C. for an additional 30 minutes and then cooled to 50° C. After solids were allowed to settle, supernatant liquid was decanted and the purple solid was washed 10 times with 224-milliliter portions of n-hexane. The average particle size of the resulting particles was 28.5±4.2 microns.

EXAMPLE II

A titanium trichloride catalyst component was prepared in a manner similar to that described in Example I except no additional ether was added after activation with the chlorosilane. A purple solid was obtained.

POLYMERIZATION TESTS

A series of propylene polymerization tests using the titanium trichloride catalyst components of Examples I and II were performed using bulk polymerization techniques. A catalyst slurry was prepared in hexane containing diethylaluminum chloride (DEAC) and the titanium trichloride catalyst component. Bis(tributyl)tin sulfide (BTS) and collidine were added to the polymerization test of Example I and one test of the catalyst component of Example II. The DEAC/TiCl$_3$ molar ratio was 6:1 in all tests. In an oxygen-free, water-free, two-liter stirred Parr reactor, 1,000 milliliters of propylene were added followed by addition of 1.2 milliliters of catalyst slurry containing 0.03 grams of titanium trichloride component flushed with 300 milliliters of additional propylene and the reactor was pressured with 15 psig of hydrogen. The mixture was allowed to polymerize for two hours at 71° C. under vigorous agitation at 450 RPM. The resulting product was dried and analyzed by X-ray fluorescence (XRF) for titanium and aluminum content. Results for polymerization tests of the catalyst components produced in Examples I and II are given in Table I. Yields were calculated from XRF data. Extractables were determined by measuring loss in weight of a dry, ground polymer sample after being extracted with boiling n-hexane for six hours.

TABLE I

| Example | Yield (g/g of TiCl$_3$) | Extractables (%) | Bulk Density (lbs/ft$^3$) |
|---|---|---|---|
| I | 9,254 | 5.8 | 27.9 |
| I (1) | 9,118 | 2.7 | 27.9 |
| I (2) | 11,071 | 1.6 | 28.5 |
| I (3) | 10,333 | 1.6 | 28.3 |
| II | 11,923 | 4.2 | 29.2 |
| II (1) | 8,159 | 1.5 | 29.9 |
| II (2) | 12,917 | 1.0 | 29.9 |

(1) DEAC/TiCl$_3$/BTS/Collidine molar ratio was 6/1/0.03/0.03.
(2) DEAC/TiCl$_3$/BTS/Collidine molar ratio was 6/1/0.06/0.06.
(3) DEAC/TiCl$_3$/BTS/Collidine molar ratio was 6/1/0.10/0.10.

EXAMPLE III

A titanium trichloride catalyst component was prepared in a manner similar to that described in Example I except trichloromethyl trichlorosilane was used. The silane/TiCl$_3$ molar ratio was 0.80. Results of bulk polymerization tests using this catalyst component are shown in Table II.

EXAMPLE IV

A titanium trichloride catalyst component was prepared in a manner similar to that described in Example I except the diisoamyl ether/di-n-butyl ether molar ration was 3:2. The silane/titanium trichloride molar ratio was 1.186. Results of bulk polymerization tests using this catalyst component are shown in Table II.

EXAMPLE V

A titanium trichloride catalyst component was prepared in a manner similar to that described in Example IV except a diisoamyl ether/di-n-butyl ether molar ratio of 1:1 was used. Bulk polymerization test results are shown in Table II.

TABLE II

| Example | Yield (g/g of TiCl$_3$) | Extractables (%) | Bulk Density (lbs/ft$^3$) |
|---|---|---|---|
| III (1) | 9,254 | 1.4 | 29.7 |
| IV (2) | 8,378 | 1.3 | 31.4 |
| IV (3) | 9,688 | 1.7 | 30.9 |
| V (2) | 9,254 | 2.2 | 29.1 |

(1) DEAC/TiCl$_3$/BTS/Collidine molar ratio was 6/1/0.06/0.06.
(2) DEAC/TiCl$_3$/BTS/Collidine molar ratio was 7/1/0.03/0.03.
(3) DEAC/TiCl$_3$/BTS/Collidine molar ratio was 7/1/0.06/0.06.

COMPARATIVE RUN A

The procedure in Example III was repeated except 27.2 grams (1.664 moles) of ethyl trichlorosilane were used (silane/TiCl$_3$ molar ratio was 1.13). Activation proceeded for seven hours at 88° C. The resulting catalyst component remained brown-like.

COMPARATIVE RUN B

The procedure of Example III was repeated except a diisoamyl ether/di-n-butyl ether molar ratio of 3:2 was used and 62.2 grams (0.366 moles) of silicon tetrachloride were used. Activation proceeded for two hours at 71° C. followed by 10 hours at 88° C. The resulting catalyst component was dark brown. Results of bulk polymerization tests are shown in Table III.

COMPARATIVE RUN C

The procedure of Example II was repeated except titanium tetrachloride was used instead of the chlorosilane (TiCl$_4$/TiCl$_3$=1.0). Activation proceeded for two hours at 70° F. The resulting catalyst component was purple. Results of bulk polymerization tests are shown in Table III.

TABLE III

| Run | Yield (g/g of TiCl$_3$) | Extractables (%) | Bulk Density (lbs/ft$^3$) |
|---|---|---|---|
| B (1) (2) | 4,559 | 14.2 | — |
| B (1) | 3,804 | 6.9 |  |
| B (3) | 5,167 | 5.6 |  |
| C (4) | 11,481 | 1.1 | 31.9 |

(1) DEAC/TiCl$_3$/BTS/Collidine molar ratio was 7/1/0.06/0.06.
(2) TiCl$_3$ component used after activation at 71° C. for two hours.
(3) DEAC/TiCl$_3$/BTS/Collidine molar ratio was 7/1/0.1/0.08.
(4) DEAC/TiCl$_3$/BTS/Collidine molar ratio was 6/1/0.03/0.03.

The data show that catalysts prepared from titanium trichloride components made according to this invention are very effective in polymerizing olefins, such as propylene, to highly crystalline polymeric materials.

What is claimed is:

1. A titanium-containing olefin polymerization catalyst component formed by reducing titanium tetrachloride with an organoaluminum compound, optionally contacting the reduced solid with a pretreatment amount of alpha-olefin monomer under polymerization conditions, and reacting with a Lewis base complexing agent and a haloalkylchlorosilane.

2. The catalyst component of claim 1 wherein the Lewis base complexing agent is an ether, a thioether or a thiol.

3. The catalyst component of claim 1 wherein the Lewis base complexing agent is a lower alkyl ether.

4. The catalyst component of claim 1 wherein the Lewis base complexing agent is a di-n-butyl ether, diisoamyl ether or a mixture thereof.

5. The catalyst component of claim 1 wherein the haloalkylchlorosilane has a formula

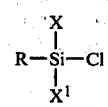

wherein R is a haloalkyl radical containing one to about ten carbon atoms or a halosilyl radical or haloalkylsilyl radical containing one to about eight carbon atoms, and X and X$^1$ are halogen, hydrogen, or alkyl or haloalkyl radicals containing one to about ten carbon atoms.

6. The catalyst component of claim 5 wherein R is a chloroalkyl radical containing one to about eight carbon atoms and one to about twelve chlorine atoms, and X is chlorine or a chloroalkyl radical containing one to four carbon atoms, and X$^1$ is chlorine or hydrogen.

7. The catalyst component of claim 5 wherein the haloalkylchlorosilane is a dichlorosilane or trichlorosilane and R is a chloroalkyl radical containing one to four carbon atoms and one to ten chlorine atoms.

8. The catalyst component of claim 5 wherein the haloalkylchlorosilane is dichloromethyl trichlorosilane, trichloromethyl trichlorosilane, dichloromethyl dichlorosilane, trichloromethyl dichlorosilane, chloromethyl trichlorosilane or chloromethyl dichlorosilane.

9. The catalyst component of claim 5 wherein the haloalkylchlorosilane is hexachlorodisilane.

10. The catalyst component of claim 1 wherein the Lewis base complexing agent is a mixture of di-n-butyl ether and diisoamyl ether.

11. The catalyst component of claim 1 wherein the molar ratio of Lewis base to titanium compound is between about 1 to 1 and about 1.5 to 1.

12. The catalyst component of claim 9 wherein the molar ratio of Lewis base to titanium compound is between about 1.25 to 1 and about 1.35 to 1.

13. The catalyst component of claim 1 wherein the reduced titanium compound is pretreated with an olefin monomer.

14. The catalyst component of claim 13 wherein the olefin monomer is propylene.

15. The catalyst component of claim 9 wherein the reduced titanium compound is pretreated with propylene.

16. The catalyst component of claim 12 wherein the molar ratio of Lewis base to titanium compound is between about 1.25 to 1 and about 1.35 to 1.

17. The catalyst component of claim 1 wherein additional Lewis base is added after initial reaction of the reduced titanium compound with a Lewis base and a haloalkylchlorosilane.

18. The catalyst component of claim 13 wherein the pretreated, reduced titanium-containing compound first is reacted with a mixture of di-n-butyl ether and diisoamyl ether such that the molar ratio of ethers or titanium compound is between 1 to 1 and about 1.5 to 1, secondly the resulting mixture is reacted with dichloromethyl trichlorosilane and thirdly the resulting mixture is reacted with additional quantities of a mixture of di-n-butyl ether and diisoamyl ether.

19. The catalyst component of claim 1 combined with 0.1 to 30 mol percent of a catalyst modifier.

20. A method to make a titanium-containing catalyst component comprising (a) reducing titanium tetrachloride with an organoaluminum compound (b) contacting reduced solids from (a) with a Lewis base complexing agent and a haloalkylchlorosilane.

21. The method of claim 20 wherein the organoaluminum compound has a formula $R_nAlX_{3-n}$ where R is an alkyl group having one to about 10 carbon atoms, X is a halogen, and n is greater than zero and less than or equal to three.

22. The method of claim 20 wherein the titanium tetrachloride is reduced at a temperature of about $-50°$ C. to about 30° C.

23. The method of claim 20 wherein the organoaluminum compound is diethylaluminum chloride or ethyl aluminum sesquichloride.

24. The method of claim 20 wherein the Lewis base complexing agent is a lower alkyl ether.

25. The method of claim 20 wherein the Lewis base complexing agent is diisoamyl ether, di-n-butyl ether or a mixture thereof.

26. The method of claim 20 wherein the haloalkylchlorosilane has a formula

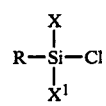

wherein R is a haloalkyl radical containing one to about ten carbon atoms or a halosilyl radical or haloalkylsilyl radical containing one to about eight carbon atoms, and X and $X^1$ are halogen, hydrogen, or alkyl or haloalkyl radicals containing one to about ten carbon atoms.

27. The method of claim 26 wherein R is a chloroalkyl radical containing one to about eight carbon atoms and one to about twelve chlorine atoms, and X is chlorine or a chloroalkyl radical containing one to four carbon atoms, and $X^1$ is chlorine or hydrogen.

28. The method of claim 27 wherein the haloalkylchlorosilane is a dichlorosilane or trichlorosilane and R is a chloroalkyl radical containing one to four carbon atoms and one to ten chlorine atoms.

29. The method of claim 28 wherein the haloalkylchlorosilane is dichloromethyl trichlorosilane, trichloromethyl trichlorosilane, dichloromethyl dichlorosilane, trichloromethyl dichlorosilane, chloromethyl trichlorosilane or chloromethyl dichlorosilane.

30. The method of claim 26 wherein the haloalkylchlorosilane is hexachlorodisilane.

31. The method of claim 24 wherein the molar ratio of ether to titanium compound is between about 1 to 1 and about 1.5 to 1.

32. The method of claim 24 wherein (a) titanium tetrachloride is reduced with diethylaluminum chloride or ethylaluminum sesquichloride at a temperature of about $-30°$ C. to about 0° C. and (b) the reduced solids from (a) are contacted with n-butyl ether, diisoamyl ether or a mixture thereof and dichloromethyl trichlorisilane at an activation temperature of about 80° to about 90° C.

* * * * *

UNITED STATES PATENT OFFICE
CERTIFICATE OF CORRECTION

Patent No. 4,422,956               Dated December 27, 1983

Inventor(s) Gregory G. Arzoumanidis and Sam S. Lee

It is certified that error appears in the above-identified patent and that said Letters Patent are hereby corrected as shown below:

| Col. | Line | |
|---|---|---|
| 2 | 16 | "4,158,988" should be --4,158,088-- |
| 8 | 22 | "22.5 + 3" should be --22.5 $\pm$ 3-- |
| 11 | 35 | "ethers or tita" should be --ethers to tita-- |

Signed and Sealed this

Twenty-sixth Day of June 1984

[SEAL]

Attest:

GERALD J. MOSSINGHOFF

*Attesting Officer*    *Commissioner of Patents and Trademarks*